(12) United States Patent
Ponagai et al.

(10) Patent No.: US 6,568,246 B1
(45) Date of Patent: May 27, 2003

(54) SYSTEM AND METHOD FOR DETECTING AN AIR LEAK IN AN EXHAUST SYSTEM COUPLED TO AN ENGINE

(75) Inventors: Edward Ponagai, Dearborn Hts., MI (US); Gary Lee Danhoff, Redford, MI (US); Ghassan Hussini, Dearborn Hts., MI (US); Ghassan K. Raad, Farmington Hills, MI (US); Michael igor Kluzner, oak park, MI (US); Raymond Henry Berger, Canton, MI (US); Robert Joseph Jerger, Dexter, MI (US)

(73) Assignee: Ford Global Technologies, L.L.C., Dearborn, MI (US)

( * ) Notice: Subject to any disclaimer, the term of this patent is extended or adjusted under 35 U.S.C. 154(b) by 0 days.

(21) Appl. No.: 10/044,602

(22) Filed: Jan. 11, 2002

(51) Int. Cl.[7] ................................................ G01M 3/08
(52) U.S. Cl. ................................................ 73/40.5 R
(58) Field of Search ............................... 73/40, 40.5 R, 73/46, 118.1

(56) References Cited

U.S. PATENT DOCUMENTS

| | | | |
|---|---|---|---|
| 5,351,526 A | * 10/1994 | Krohm et al. | ................ 73/40 |
| 5,372,036 A | 12/1994 | Kainz | |
| 5,531,100 A | 7/1996 | Mezger et al. | |
| 5,617,722 A | 4/1997 | Takaku | |
| 5,706,793 A | 1/1998 | Orzel et al. | |
| 6,067,965 A | 5/2000 | Trumpy et al. | |

FOREIGN PATENT DOCUMENTS

WO     9935388    * 7/1999       F02D/41/02

* cited by examiner

*Primary Examiner*—Hezron Williams
*Assistant Examiner*—Jay L Politzer
(74) *Attorney, Agent, or Firm*—John F. Buckert; Allan J. Lippa

(57) ABSTRACT

A system and method for detecting an air leak within an exhaust system is provided. The method includes measuring an exhaust gas constituent in exhaust gases from the engine when the engine is operating in an idle operating mode. The method further includes determining whether the air leak is present in the exhaust system based on a measured exhaust gas constituent, a first air-fuel correction value, and a second air-fuel correction value.

7 Claims, 3 Drawing Sheets

US 6,568,246 B1

SYSTEM AND METHOD FOR DETECTING AN AIR LEAK IN AN EXHAUST SYSTEM COUPLED TO AN ENGINE

FIELD OF THE INVENTION

The invention relates to a system and method for detecting an air leak in an exhaust system coupled to an engine.

BACKGROUND OF THE INVENTION

To meet current emission regulations, automotive vehicles must regulate the air-fuel ratio supplied to the vehicles' engine cylinders to achieve maximum efficiency of exhaust gas catalysts. For this purpose, it is known to control the air-fuel ratio of an internal combustion engine using an exhaust gas oxygen sensor positioned in the exhaust stream from the engine. The exhaust gas sensor provides feedback data to an electronic controller that calculates desired air-fuel ratio values over time to achieve optimum efficiency of the catalyst in the exhaust system.

When an air leak occurs in an exhaust system upstream of an exhaust gas sensor, atmospheric air may be inducted into the exhaust system during idle or deceleration operating conditions. As a result, the exhaust gas sensor may indicate a lean air-fuel ratio even though a combusted air-fuel mixture in an engine cylinder was not a lean mixture. An electronic engine controller utilizing the inaccurate air-fuel ratio measurement may not be able to maintain an optimal air-fuel ratio for optimal catalyst efficiency. Thus, air leaks in the exhaust system may result in increased emissions and decreased fuel economy.

A known engine control system detects air leaks in an exhaust system by measuring the number of switch transitions in an output signal of an oxygen sensor disposed upstream of an emission catalyst. However, the known system relies only the instantaneous oxygen sensor signals and not on any other engine air-fuel control parameters. Thus, the known system may incorrectly indicate air leaks in the exhaust system during relatively short transient operation of the oxygen sensor when no air leak actually exists.

The inventors herein have thus recognized that there is a need for a more accurate system and method for detecting an air leak within an exhaust system coupled to an engine.

SUMMARY OF THE INVENTION

The foregoing problems and disadvantages are overcome by a system and method for detecting an air leak within an exhaust system.

The method for detecting an air leak within an exhaust system includes measuring an exhaust gas constituent in exhaust gases from the engine when the engine is operating in an idle operating mode. The method further includes determining when the air leak is present in the exhaust system based on a level of the measured exhaust gas constituent, a first air-fuel correction value, and a second air-fuel correction value.

A system for detecting an air leak within an exhaust system is also provided. The system includes a first sensor generating a first signal indicative of a mass air flow or a pressure in the intake manifold. The system further includes a second sensor generating a second signal indicative of an engine speed. The system further includes a third sensor generating a third signal indicative of an air-fuel ratio in exhaust gases from the engine. Finally, the system includes a controller operably connected to the first, second, and third sensors. The controller is configured to determine when the engine is operating in an idle operating mode based on the first and second signals. The controller is further configured to determine whether the air leak is present in the exhaust system based on the third signal, a first air-fuel correction value, and a second air-fuel correction value.

The inventive system and method provides a substantial advantage over known systems and methods. In particular, the system and method can more accurately detect air leaks in exhaust system by utilizing two air-fuel correction values in conjunction with an exhaust gas sensor signal.

DESCRIPTION OF AN EMBODIMENT

Figure 1:
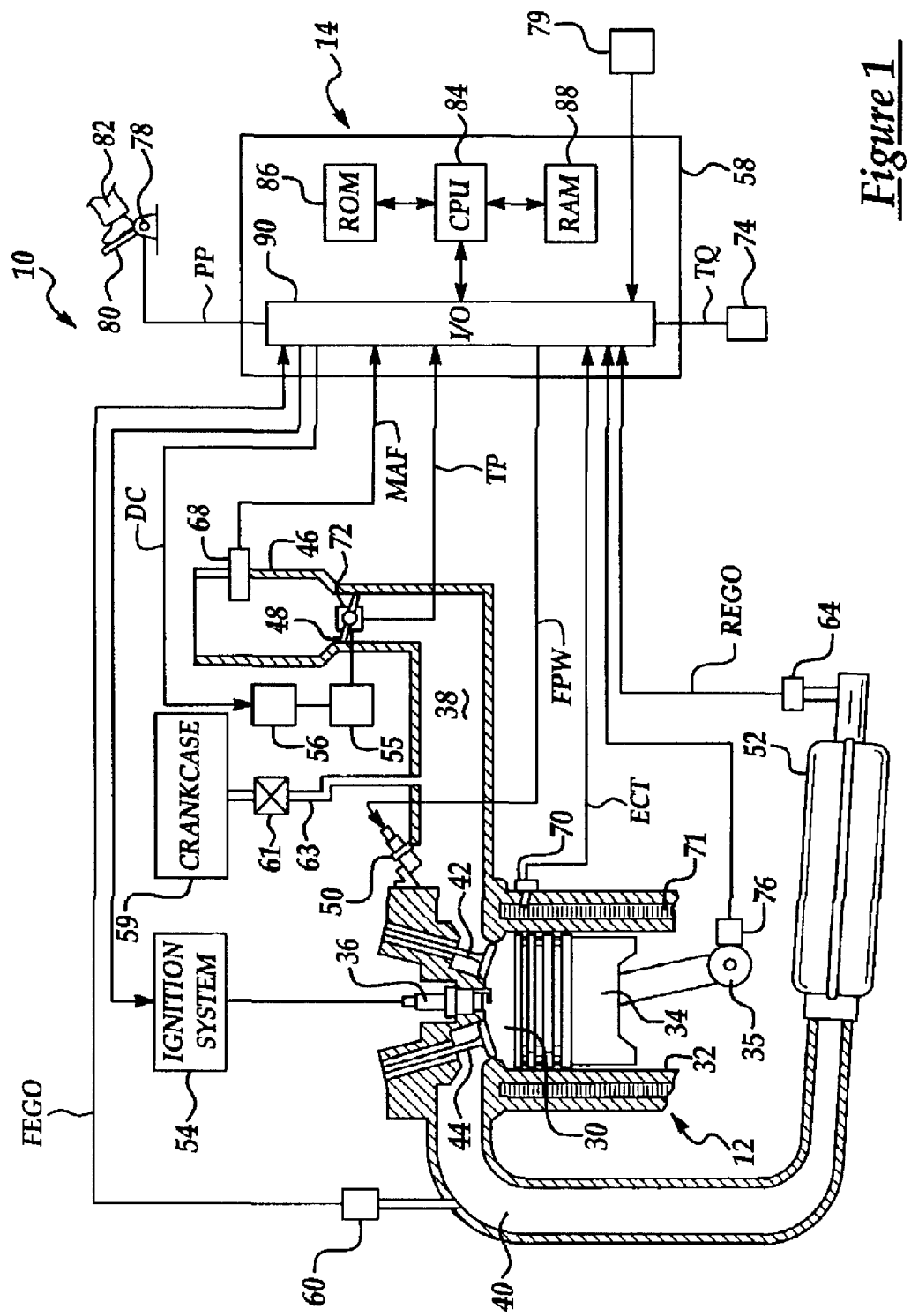
FIG. 1 is block diagram of an automotive vehicle having an engine and an engine control system.

Referring now to the drawings, like reference numerals are used to identify identical components in the various views. Referring to FIG. 1, an automotive vehicle 10 includes an internal combustion engine 12 and an engine control system 14.

Engine 12 may include a plurality of cylinders, however only one cylinder is shown for clarity of illustration. Engine 12 may further include a combustion chamber 30, cylinder walls 32, a piston 34, a crankshaft 35, a spark plug 36, an intake manifold 38, an exhaust manifold 40, an intake valve 42, an exhaust valve 44, a throttle body 46, a throttle plate 48, a fuel injector 50, and a catalytic converter 52.

Combustion chamber 30 communicates with intake manifold 38 and exhaust manifold 40 via respective intake and exhaust valves 42, 44. Piston 34 is positioned within combustion chamber 30 between cylinder walls 32 and is connected to crankshaft 35. Ignition of an air-fuel mixture within combustion chamber 30 is controlled via spark plug 36 which delivers ignition spark responsive to a signal from distributorless ignition system 54.

Intake manifold 38 communicates with throttle body 46 via throttle plate 48. Throttle plate 48 is controlled by electric motor 55 which receives a signal from ETC driver 56. ETC driver 56 receives a control signal (DC) from a controller 58. Intake manifold 38 is also shown having fuel injector 50 coupled thereto for delivering fuel in proportion to the pulse width of signals (FPW) from controller 58. Fuel is delivered to fuel injector 50 by a conventional fuel system (not shown) including a fuel tank, fuel pump, and fuel rail (now shown). Although port fuel injection is shown, direct fuel injection could be utilized instead of port fuel injection. Intake manifold 38 also communicates with a crankcase 59 via a positive crankcase (PCV) valve 61. When valve 61 is open, unburned fuel and exhaust gases trapped in crankcase 59 are inducted into intake manifold 38. As will be discussed in more detail below, if an air leak occurs near PCV valve 61 in conduit 63, additional atmospheric air may be inducted directly into manifold 38 which can affect, closed-loop air-fuel control. Similarly, if PCV valve 61 becomes disconnected from conduit 63, additional air may be inducted into manifold 38 affecting closed-loop air-fuel control.

Exhaust manifold 40 communicates with catalyst 52, respectively, which may comprise a three-way catalytic converter for example. The "exhaust system" includes the components downstream of the engine cylinder and includes exhaust manifold 40 and catalyst 52. Catalyst 52 reduces exhaust gas constituents such as nitrous oxides (NOx) and oxidizes carbon monoxide (CO) and hydrocarbons (HC). As illustrated, exhaust gas sensor 60 is disposed upstream of catalyst 52 and exhaust gas sensor 64 is disposed downstream of catalyst 52. Exhaust gas sensors 60, 64 may comprise one of an EGO sensor, a HEGO sensor, or a UEGO sensor. Sensor 60 may generate signal FEGO indicative of an air/fuel ratio in exhaust gases upstream of catalyst 52. Sensor 64 may generate signal REGO indicative of an air/fuel ratio in exhaust gases downstream of catalyst 52. As will be discussed in greater detail below, if an air leak occurs upstream of exhaust gas sensor 60, atmospheric air will be inducted directly into exhaust manifold 40 which can cause the signal FEGO to indicate a lean air-fuel ratio, even though a lean air-fuel mixture was not combusted in the engine cylinder. As such, the air leak can affect closed-loop air-fuel control of engine 12.

Control system 14 is provided to control the operation of engine 12 and to implement a method for detecting an air leak within engine 12 or the exhaust system. Control system 14 includes distributorless ignition system 54, an electric motor 55 for controlling throttle plate 48, an ETC driver 56, exhaust gas sensors 60, 64, a mass air flow sensor 68, a temperature sensor 70, a throttle position sensor 72, a torque sensor 74, an engine speed sensor 76, a pedal position sensor 78, an accelerator pedal 80, and controller 58.

Mass air flow sensor 68 generates a signal indicating the inducted mass air flow (AM) that is transmitted to controller 58. Sensor 68 may be coupled to the throttle body 46 or intake manifold 38. As discussed above, if an air leak occurs downstream of sensor 68, the inducted air flow into the engine cylinder will be greater than the measured air flow (AM). In an alternate embodiment (not shown), sensor 68 could be replaced by a pressure sensor measuring a pressure in throttle body 46 or intake manifold 38 where the air flow (AM) is calculated based on the measured pressure.

Temperature sensor 70 generates a signal indicating the engine coolant temperature (ECT) received by controller 58. Sensor 70 may be coupled to cooling jacket 71 in cylinder wall 32.

Throttle position sensor 72 generates a signal indicating a throttle position (TP) of throttle plate 48 received by controller 58 for closed-loop control of plate 48.

Torque sensor 74 generates a signal (TQ) that may indicate one of following torque values: (i) an engine crankshaft torque, ii) a transmission torque, such as for example, a torque converter turbine torque or a transmission output shaft torque, or (iii) an axle torque.

Engine speed sensor 76 may comprise a hall effect sensor that generates a signal (N) indicating an engine speed. Sensor 76 may be coupled to crankshaft 35 and transmits signal (N) to controller 58.

Vehicle speed sensor 79 is conventional in the art and may be operably connected to a vehicle wheel (not shown) or to a drive train (not shown) of vehicle 10. Sensor 79 generates a signal (S) indicative of vehicle speed that is transmitted to controller 58.

Accelerator pedal 80 is shown communicating with a driver's foot 82. Pedal position sensor 78 generates a signal indicating acceleration pedal position (PP) that is transmitted to controller 58.

The controller 58 is provided to implement the method for detecting an air leak within engine 12 or the exhaust system in accordance with the present invention. The controller 58 includes a microprocessor 84 communicating with various computer-readable storage media. The computer readable storage media preferably include nonvolatile and volatile storage in a read-only memory (ROM) 86 and a random-access memory (RAM) 88. The computer readable media may be implemented using any of a number of known memory devices such as PROMs, EPROMs, EEPROMs, flash memory or any other electric, magnetic, optical or combination memory device capable of storing data, some of which represent executable instructions, used by microprocessor 84 in controlling engine 12. Microprocessor 84 communicates with various sensors and actuators (discussed above) via an input/output (I/O) interface 90. Of course, the present invention could utilize more than one physical controller to provide engine/vehicle control depending upon the particular application.

Figure 2A:
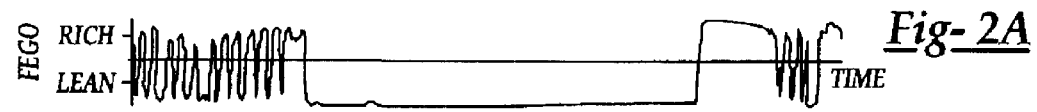
FIGS. 2A–2D are schematics of signals used to determine when an air leak in an engine intake manifold is detected.

Before discussing the method for detecting an air leak in accordance with the present invention, the signals utilized by the method will be discussed. Referring to FIG. 2A, the signal FEGO generated by exhaust gas sensor 60 is illustrated. As discussed above, the signal FEGO is indicative of an air-fuel ratio measured in exhaust gases from engine 12.

Figure 2B:
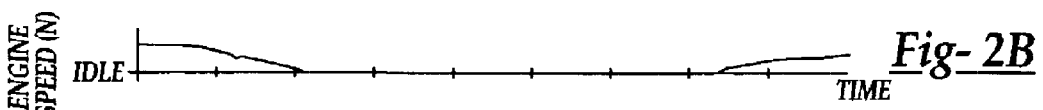

Referring to FIG. 2B, the engine speed (N) over time is illustrated.

Figure 2C:
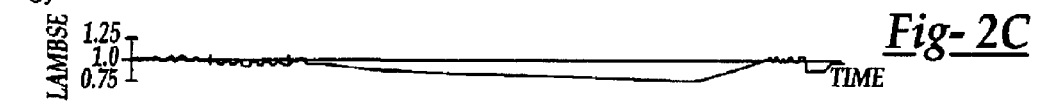

Referring to FIG. 2C, the a short term air-fuel ratio correction value LAMBSE is utilized to adjusted the fuel delivery the engine cylinders to adjust the fuel delivery to compensate for rich or lean fueling errors as detect by exhaust gas sensor 60. LAMBSE is generally a proportional-integral value of output signal FEGO generated by sensor 60. LAMBSE is an average value of unity when engine 12 is operating at stoichiometry and there are not steady-state air/fuel errors or offsets. For typical engine operation, LAMBSE ranges from 0.75–1.25.

Figure 2D:
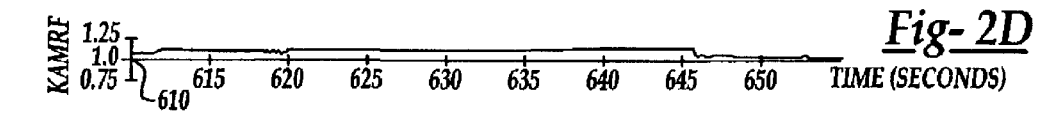
Figure 3A:
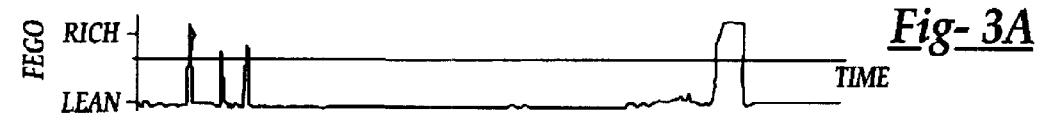
FIGS. 3A–3D are schematics of signals used to determine when an air leak proximate a PCV valve in an engine is detected.
Figure 3B:
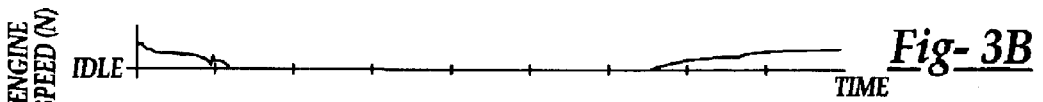
Figure 3C:
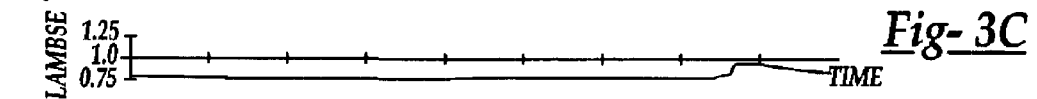
Figure 3D:
Figure 4A:
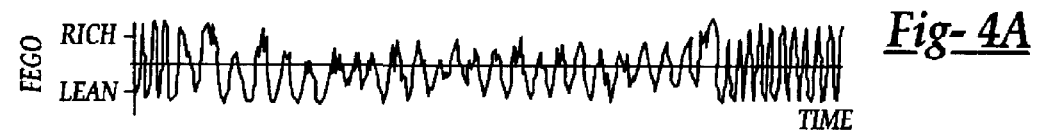
FIGS. 4A–4D are schematics of signals used to determine when an air leak in an exhaust system coupled to an engine is detected.
Figure 4B:
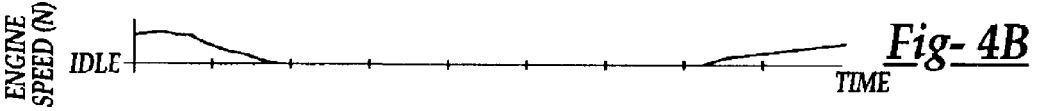
Figure 4C:
Figure 4D:
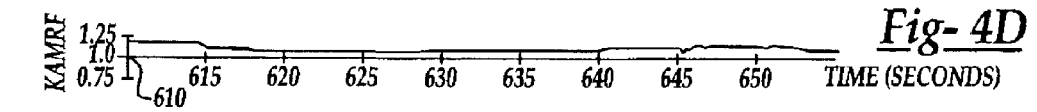

Referring to FIG. 2D, a long term air fuel ratio adaptive correction value, KAMRF is illustrated. The value KAMRF may be determined based on at least one stored value in a table indexed by engine speed and load, or air charge temperature. The correction values LAMBSE and KAMRF are utilized in adjusting fuel delivery to engine 12 as follows:

Fuel_flow=$AM*KAMRF/(14.65*LAMBSE)$

It should be understood, however, alternate and/or additional air-fuel correction values could be utilized. For example, an air-fuel correction value based on signal REGO indicative of an air/fuel ratio downstream of catalyst 52 could be utilized to calculate the Fuel_flow.

Referring to FIGS. 2A–2D, signals generated when an air leak is detected in intake manifold 38 are illustrated. It should be noted that air leaks in intake manifold 38 are detected when engine 12 is operating in idle operating mode. As shown, at time T=620 seconds for example, the engine speed (N) is at an idle speed. Thereafter, signal FEGO indicates a lean air-fuel ratio for an extended amount of time (e.g., time T=620–645 seconds). In response, controller 58 begins to adjust LAMBSE toward a more rich air-fuel value and KAMRF toward a more rich air-fuel value. At time T=645 seconds, for example, when controller 58 determines that (i) signal FEGO indicates a lean air-fuel ratio, (ii) engine speed is at an idle speed, (iii) LAMBSE corresponds to a rich air-fuel ratio, and (iv) KAMRF corresponds to a rich air-fuel ratio—controller 58 indicates that an air leak was detected in intake manifold 58.

Referring to FIGS. 3A–3D, signals generated when an air leak is detected proximate to PCV valve 61 are illustrated. It should be noted that air leaks proximate PCV valve 61 are detected when engine 12 is operating in idle operating mode. As shown, at time T=617 seconds for example, the engine speed (N) is at an idle speed. Thereafter, signal FEGO indicates lean air-fuel ratio for an extended amount of time (e.g., time T=618–645 seconds). In response, controller 58 begins to adjust LAMBSE toward a relatively large rich air-fuel value and adjusts KAMRF toward a relatively large rich air-fuel value. At time T=645 seconds, when controller 58 determines that (i) HEGO indicates a lean air-fuel ratio, (ii) engine speed (N) is at an idle speed, (iii) LAMBSE corresponds to a relatively large rich air-fuel ratio, and (iv) KAMRF corresponds to a relatively large rich air-fuel ratio—controller 58 indicates that an air leak was detected proximate PCV valve 61. It should be noted that the air leak could occur if PCV valve 61 was not connected to conduit 63 or a hole formed in conduit 63.

Referring to FIGS. 4A–4D, signals generated when an air leak is detected proximate the exhaust system coupled to engine 12 are illustrated. It should be noted that air leaks in the exhaust system are detected after a decelerating operating mode in a subsequent idle operating mode of engine 12. As shown, between times T=615–620 seconds, engine 12 is in a deceleration operating mode and after time T=620 seconds enters an idle speed operating mode. Further, signal FEGO indicates a lean air-fuel ratio for an extended amount of time (e.g., time T=620–645 seconds). In response, controller 58 begins to adjust LAMBSE toward a rich air-fuel value and adjusts KAMRF toward a rich air-fuel value. At time T=645 seconds, when controller 58 determines that (i) HEGO indicates a lean air-fuel ratio, (ii) engine speed (N) is at an idle speed (after decelerating), (iii) LAMBSE corresponds to a rich air-fuel ratio, and (iv) KAMRF corresponds to a rich air-fuel ratio—controller 58 indicates that an air leak was detected in the exhaust system of engine 12. In particular, controller 58 indicates that an air leak occurred upstream of exhaust gas sensor 60 or proximate sensor 60.

Figure 5:
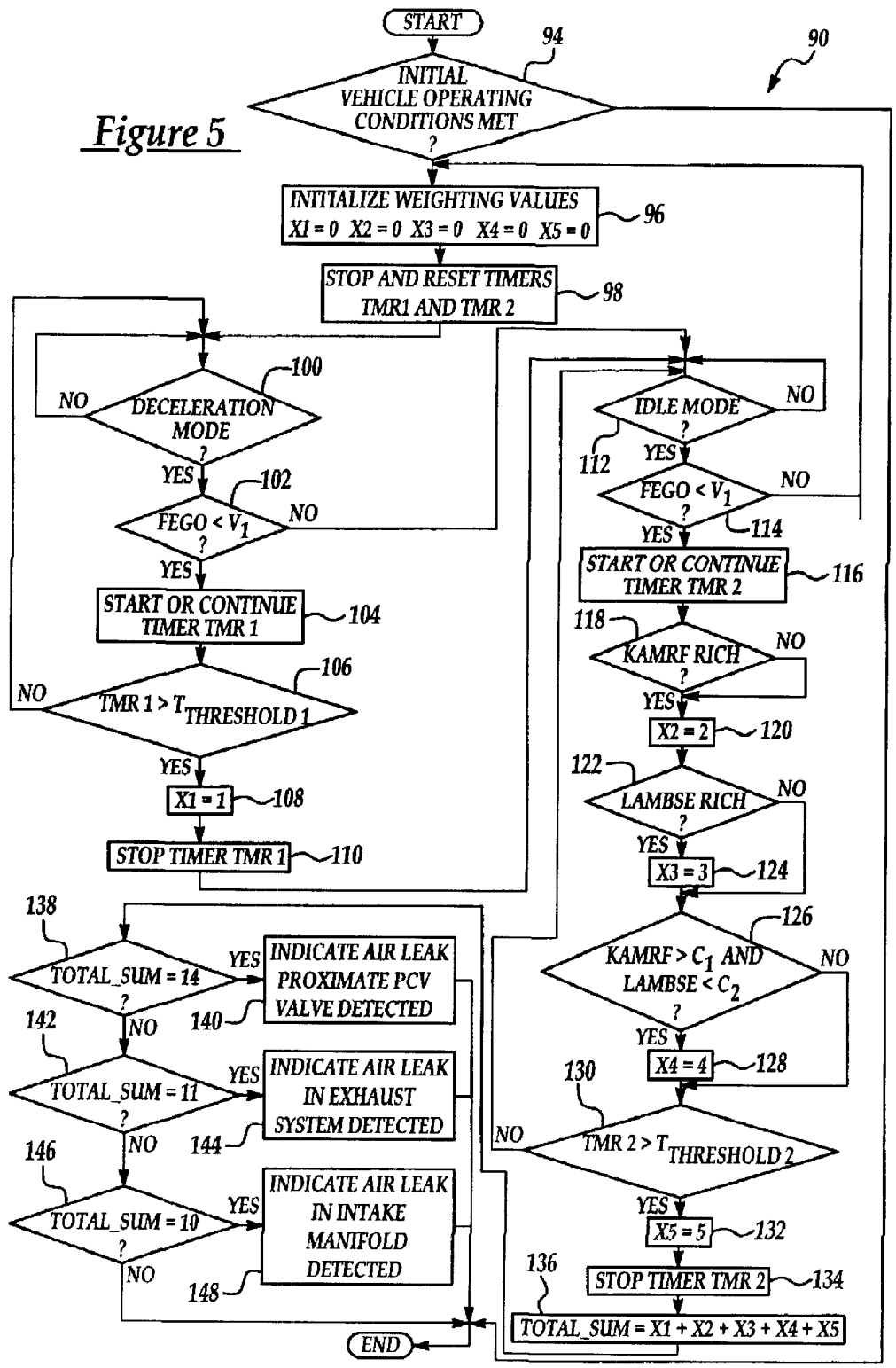
FIG. 5 is a flowchart of a method for detecting an air leak within an engine or an exhaust system.

Referring to FIG. 5, a method 92 for detecting an air leak within engine 12 or an exhaust system coupled to engine 12 will now be explained. For purposed of simplicity, the method 92 is described with reference to a vehicle 10 having a single intake manifold 38 and a single exhaust system. However, the method 92 can also be utilized with vehicles having dual intake manifolds or dual exhaust systems by simply duplicating the steps of method 92 for each respective intake manifold or exhaust system.

At step 94, a determination is made as to whether initial vehicle operating conditions are met for detecting air leaks. In particular, controller 58 determines whether the engine coolant temperature (ECT), the air charge temperature (ACT), and catalyst temperature are above predetermined respective thresholds. If the foregoing conditions are met and the value of step 94 equals "Yes", the step 96 is performed. Otherwise, the method is exited.

At step 96, the weighting values X1, X2, X3, X4, X5 are initialized to zero.

At step 98, the timers TMR1 and TMR2 are stopped and reset. The timer TMR1 will be utilized to determine an amount of time that engine 12 is in a deceleration operating mode. The timer TMR2 will be utilized to determine an amount of time that engine 12 is in an idle operating mode.

Next at step 100, a determination is made as to whether engine 12 is operating in a deceleration operating mode. Controller 58 may access an engine speed/load table using engine speed (N) and air flow rate (AM) to determine whether engine 12 is operating in deceleration mode. If the value of step 100 equals "Yes", the method advances to step 102. Otherwise, the method re-executes step 100.

At step 102, a determination is made as to whether signal FEGO is less than a predetermined voltage $V_1$. Voltage $V_1$ represents a voltage corresponding to a lean air-fuel ratio, such as 0.4 Vdc when sensor 60 comprises a HEGO sensor. If the value of step 102 equals "Yes", the method advances to step 104. Otherwise, the method advances to step 112 explained below.

At step 104, timer TMR1 is either started or continues to be incremented. TMR1 will be incremented as long as engine 12 is in the deceleration operating mode.

Next at step 106, a determination is made as to whether timer TMR1 is greater than a threshold time $T_{THRESHOLD1}$. The time $T_{THRESHOLD1}$ may be equal to 10 seconds for example. If the value of step 106 equals "No", the method returns to step 100. Otherwise, the method advances to step 108 which sets value X1 according to the following equation:

$$X1=1$$

Next at step 110, the timer TMR1 is stopped and the method advances to step 112.

At step 112, a determination is made as to whether engine 12 is operating in an idle operating mode. Controller 58 may access an engine speed/load table using engine speed (N) and air flow rate (AM) to determine whether engine 12 is operating in idle mode. If the value of step 112 equals "Yes", the method advances to step 114. Otherwise, the method returns to step 112 waiting for engine 12 to enter idle mode.

At step 114, a determination is made as to whether signal FEGO is less than predetermined voltage $V_1$ which represents a voltage corresponding to a lean air-fuel ratio. If the value of step 114 equals "Yes", the method advances to step 116. Otherwise, the method returns to step 96 to thereafter wait for another deceleration operating mode.

At step 116, timer TMR2 is either started or continues to be incremented. TMR2 will be incremented as long as engine 12 is in the idle operating mode.

Next at step 118, a determination is made as to whether the value KAMRF corresponds to a rich air-fuel ratio. If the value of step 118 equals "Yes", the step 120 sets the value X2 according to the following equation:

$$X2=2$$

and the method advances to step 122. Otherwise, if the value of step 118 equals "No, the method also advances to step 122.

At step 122, a determination is made as to whether the value LAMBSE corresponds to a rich air-fuel ratio. If the value of step 122 equals "Yes", the step 124 set the value X3 using the following equation:

$$X3=3$$

and advances to step 126. Otherwise, if the value of step 122 equals "No, the method also advances to step 126.

Next, step 126 determines whether (i) value KAMRF is greater than a threshold value C1 and (ii) value LAMBSE is less than a threshold value C2. The value C1 corresponds to a relatively rich air-fuel ratio (for KAMRF) and may have a value of 1.2 for example. The value C2 corresponds to a relatively large rich air-fuel ratio (for LAMBSE) and may have a value of 0.8 for example. If the value of step 126 equals "Yes", the step 128 sets the value X4 using the following equation:

$$X4=4$$

and the method advances to step 130. Otherwise, if the value of step 126 equals "No", the method also advances to step 130.

At step 130, a determination is made as to whether timer TMR2 is greater than a threshold time $T_{THRESHOLD2}$. The time $T_{THRESHOLD2}$ is empirically determined and may be equal to 20 seconds for example. If the value of step 130 equals "Yes", the method advances to step 132. Otherwise, the method returns to step 112.

At step 132, the value X5 is set using the following equation:

$$X5=5$$

Next at step 134, the timer TMR2 is stopped and the method advances to step 136.

At step 136, a value TOTAL_SUM is calculated utilizing the following equation:

$$TOTAL\_SUM=X1+X2+X3+X4+X5$$

Next at step 138, a determination is made as to whether the value TOTAL_SUM is equal to the value 14. If the value of step 138 equals "Yes", the step 140 indicates that an air leak was detected proximate to PCV valve 61 and the method is ended. Otherwise, the step 142 is performed.

At step 142, a determination is made as to whether the value TOTAL_SUM. is equal to the value 11. If the value of step 142 equals "Yes", the step 144 indicates that an air leak was detected in the exhaust system of vehicle 10 and the method is ended. Otherwise, the step 146 is performed.

At step 146, a determination is made as to whether the value TOTAL_SUM is equal to the value 10. If the value of step 146 equals "Yes", the step 148 indicates that an air leak was detected in intake manifold 38 of engine 12 and the method is ended. Otherwise, if the value of step 146 equals "No", the method is also ended.

The system 14 and method for detecting air leaks in an exhaust system provides a substantial advantage over conventional systems and methods. In particular, the system and method can accurately detect air leaks in an exhaust system by considering additional engine air-fuel control parameters as compared to known systems which only use an oxygen sensor signal. In particular, the system utilizes air-fuel correction value LAMBSE and air-fuel correction value KAMRF along with an exhaust gas sensor output signal to detect when the air leak occurs.

We claim:

1. A method for detecting an air leak within an exhaust system communicating with an engine, said engine including an intake manifold communicating with an engine cylinder, said method comprising:

measuring an exhaust gas constituent in exhaust gases from said engine when said engine is operating in an idle operating mode; and, determining when said air leak is present in said exhaust system based on said measured exhaust gas constituent, a first air-fuel correction value, and a second air-fuel correction value.

2. The method of claim 1 wherein said step of determining when an air leak is present includes:

indicating said air leak is detected in said exhaust system when said measured exhaust gas constituent indicates a lean air-fuel ratio, and said first air-fuel correction value corresponds to a rich air-fuel ratio, and said second air-fuel correction value corresponds to a rich air-fuel ratio.

3. The method of claim 1 wherein said exhaust gas constituent comprises oxygen.

4. The method of claim 1 wherein said first air-fuel correction value is determined based on a measured oxygen concentration in said exhaust gases.

5. The method of claim 1 wherein said second air-fuel correction value is determined based on (i) engine speed and engine load or (ii) an air charge temperature.

6. A method for detecting an air leak within an exhaust system communicating with an engine, said engine including an intake manifold communicating with an engine cylinder, fuel delivery to such engine being adjusted in accordance with a plurality of air-fuel correction values, each one of the correction values being a function of a different one of a plurality of different engine operating conditions, said method comprising:

measuring an exhaust gas constituent in exhaust gases from said engine when said engine is operating in an idle operating mode; and, determining when said air leak is present in said exhaust system based on said measured exhaust gas constituent, a first one of the plurality of air-fuel correction values, and a second one of the plurality of air-fuel correction values.

7. A method for detecting an air leak within an exhaust system communicating with an engine, said engine including an intake manifold communicating with an engine cylinder, fuel delivery to such engine being adjusted in accordance with a plurality of air-fuel correction values, each one of the correction values being a function of a different one of a plurality of different engine operating conditions, said method comprising:

determining a first value indicative of a lean air-fuel correction value for said engine;

determining a second value indicative a first one of the plurality of correction values for said engine;

determining a third value indicative of a second air-fuel one of the plurality of correction values for said engine; and indicating an air leak is detected within said exhaust system based on said first, second, and third values.

* * * * *